US007934204B2

(12) United States Patent
Brown et al.

(10) Patent No.: US 7,934,204 B2
(45) Date of Patent: Apr. 26, 2011

(54) PARTITIONING CODE IN PROGRAM CODE CONVERSION

(75) Inventors: Alex Brown, Sheffield (GB); Paul Thomas Knowles, Manchester (GB); Geraint North, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 10/802,309

(22) Filed: Mar. 17, 2004

(65) Prior Publication Data

US 2005/0015756 A1    Jan. 20, 2005

(30) Foreign Application Priority Data

Jul. 15, 2003   (GB) .................................... 0316532.1
Dec. 9, 2003    (GB) .................................... 0328121.9

(51) Int. Cl.
   *G06F 9/45* (2006.01)
(52) U.S. Cl. ........................................ 717/137; 717/106
(58) Field of Classification Search .......... 717/106–108, 717/136–145, 151–157
   See application file for complete search history.

(56) References Cited

U.S. PATENT DOCUMENTS

| 5,875,318 | A  | 2/1999 | Langford |
| 6,199,152 | B1 | 3/2001 | Kelly et al. |
| 6,205,545 | B1 | 3/2001 | Shah et al. |
| 6,339,822 | B1 | 1/2002 | Miller |
| 6,516,295 | B1 | 2/2003 | Mann et al. |
| 6,529,862 | B1 | 3/2003 | Mann et al. |
| 2003/0093775 | A1 | 5/2003 | Hilton |

FOREIGN PATENT DOCUMENTS

| EP | 0 372 835   |    | 6/1990 |
| EP | 0 372 835   | A2 | 6/1990 |
| GB | 2 400 937   | A  | 10/2004 |
| GB | 2 400 938   |    | 10/2004 |
| GB | 2 400 939   |    | 10/2004 |

OTHER PUBLICATIONS

Hsu, "A Robust Foundation for Binary Translation of X86 Code", University of Illinois at Urbana-Champaign, pp. ii-xi, 1-91, 1997.*
Muth, "ALTO: A Platform for Object Code Modification", The University of Arizona, pp. 1-163, 1999.*
U.S. Appl. No. 09/827,971, filed Apr. 6, 2001, Souloglou.
U.S. Appl. No. 10/439,966, filed May 16, 2003, Rawsthorne.

(Continued)

*Primary Examiner* — Ted T Vo
(74) *Attorney, Agent, or Firm* — Matthew B. Talpis; Gregory K Goshorn; Greg Goshorn, P.C.

(57) ABSTRACT

A partitioning technique utilized by a translator to divide the subject code space into regions, referred to hereafter as partitions, where each partition contains a distinct set of basic blocks of subject code and corresponding target code. The partitioning technique divides the translator's representation of subject code and subject code translations into non-overlapping regions of subject memory. In this manner, when the subject program modifies subject code, only those partitions actually affected by the self-modifying code need be discarded and all translations in unaffected partitions can be kept. This partitioning technique is advantageous in limiting the amount of target code that must be retranslated in response to self-modifying code operation. In another process, the partitioning technique allows multithreaded subject programs that also involve self-modifying code to perform code modification in a thread-safe manner.

19 Claims, 9 Drawing Sheets

OTHER PUBLICATIONS

U.S. Appl. No. 10/732,764, filed Dec. 10, 2003, Dankel.

Vasanth Bala, Evelyn Duesterwald and Sanjeev Banerjia, Dynamo: A Transparent Dynamic Optimization System, Copyright 2000, ACM, pp. 1-12.

M. Anton Ertl. A portable Forth engine. In EuroFORTH '93 conference proceedings, Mari' ansk' e L' azn' e (Marienbad), 1993, pp. 1-5.

The Java HotSpot™ Virtual Machine, v1.4.1, d2, A Technical White Paper, 2002, Sun Microsystems. Online at java.sun.com/products/hotspot/.

International Search Report from PCT/GB2004/003026 mailed Jun. 21, 2005, 5 pages.

* cited by examiner

Partitions before Modification

Partitions after Modification

Partitions before Modification

Partitions after Modification

TRANSLATOR WITHOUT PARTITIONS

TRANSLATOR WITH PARTITIONS

PARTITIONING CODE IN PROGRAM CODE CONVERSION

CROSS REFERENCE TO RELATED APPLICATIONS

This application claims priority to GB 0316532.1, filed Jul. 15, 2003, and to GB 0328121.9, filed Dec. 9, 2003.

BACKGROUND

1. Technical Field

The subject invention relates generally to the field of computers and computer software and, more particularly, to program code conversion methods and apparatus useful, for example, in code translators, emulators and accelerators.

2. Description of Related Art

In both embedded and non-embedded CPU's, one finds predominant Instruction Set Architectures (ISAs) for which large bodies of software exist that could be "accelerated" for performance, or "translated" to a myriad of capable processors that could present better cost/performance benefits, provided that they could transparently access the relevant software. One also finds dominant CPU architectures that are locked in time to their ISA, and cannot evolve in performance or market reach. Such architectures would benefit from "Synthetic CPU" co-architecture.

Program code conversion methods and apparatus facilitate such acceleration, translation and co-architecture capabilities and are addressed, for example, in the co-pending patent application entitled Program Code Conversion, U.S. application Ser. No. 09/827,971.

During program code conversion of a subject program designed for a subject architecture to a target program executable by a target architecture, a problem arises with respect to code that is self-modifying. "Self-modifying code" refers to a subject program that intentionally modifies its own subject code. There are several reasons why a program might modify its own code, where some examples of self-modifying code are listed in Table 1.

TABLE 1

Examples of Self-Modifying Code

| Code | Code Function |
| --- | --- |
| Overlays | Overlays are a mechanism used by systems that do not support virtual memory. To save address space, a single process can re-use a subject address range to hold different libraries at different times. Such uses may or may not be associated with system calls to mmap( ) and munmap( ). |
| Trampolines | A trampoline is a short section of code constructed in the data area (i.e., on the stack or in the heap) that contains a call to code elsewhere in the system. |
| Code Patching | Linkers and debuggers may modify (patch) existing code to implement linking or breakpoint operations. |
| Run-Time Compilers | This category includes dynamic binary translators and just-in-time (JIT) compilers. Such programs potentially write many fragments of subject code all over the data area. |
| Signal Handler | A signal handler for SIGILL (illegal instruction) might modify the code that caused the exception and continue. |

One of the main problems presented by self-modifying code to dynamic translators is that the subject code that was modified may correspond to target code which has already been translated. When such a modification of the subject code occurs, all translations of the modified subject code must be identified and discarded as stale. Thus, the translator must be able to identify all target code sequences (i.e., translations) that correspond to particular subject code addresses being modified. In dynamic translators, finding and deleting the target code which corresponds to a given subject address is difficult and sometimes not even possible. In some situations, optimizations are applied during translation which yield translations that can no longer be exactly correlated to the range of subject addresses that the translations represent. In these situations, if the subject program modifies its own code at certain subject address, the translator has no way to identify which respective translated target code to invalidate.

SUMMARY

The following is a summary of various aspects and advantages realizable according to various embodiments according to the invention. It is provided as an introduction to assist those skilled in the art to more rapidly assimilate the detailed design discussion that ensues and does not and is not intended in any way to limit the scope of the claims that are appended hereto.

In particular, the inventors have developed a number of optimization techniques directed at expediting program code conversion, particularly useful in connection with a run-time translator which employs translation of successive basic blocks of subject program code into target code wherein the target code corresponding to a first basic block is executed prior to generation of target code for the next basic block.

In a preferred process, the translator employs a partitioning technique to divide the subject code space into regions, referred to hereafter as partitions, where each partition contains a distinct set of basic blocks of subject code and corresponding target code. Partitioning divides the translator's representation of subject code and subject code translations into non-overlapping regions of subject memory. In this manner, when self-modifying code in the subject program modifies subject code, only those partitions actually affected by the self-modifying code need be discarded and all translations in unaffected partitions can be kept. This partitioning technique is advantageous in limiting the amount of target code that must be retranslated in response to self-modifying code operations. In another process, the partitioning technique allows multithreaded subject programs that also involve self-modifying code to perform code modification in a thread-safe manner.

BRIEF DESCRIPTION OF THE DRAWINGS

The accompanying drawings, which are incorporated in and constitute a part of the specification, illustrate presently preferred implementations and are described as follows.

DETAILED DESCRIPTION

Figure 1:
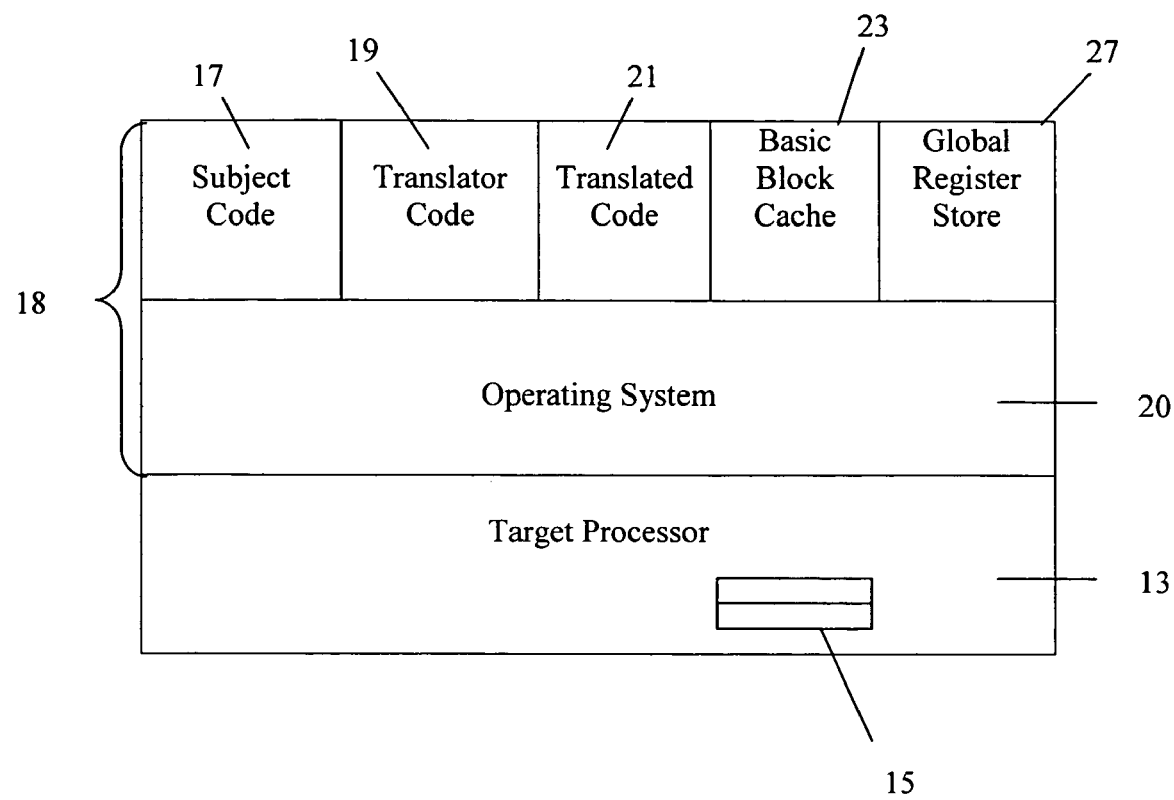
FIG. 1 is a block diagram of apparatus wherein embodiments of the invention find application.

Illustrative apparatus for implementing various novel features discussed below is shown in FIG. 1. FIG. 1 illustrates a target processor 13 including target registers 15 together with memory 18 storing a number of software components 19, 20, 21, where such memory 18 further provides a working storage for a basic block cache 23, a global register store 27, and the subject code 17 to be translated. The software components include an operating system 20, the translator code 19, and translated code 21. The translator code 19 may function, for example, as an emulator translating subject code of one ISA into translated code of another ISA or as an accelerator for translating subject code into translated code, each of the same ISA.

The translator 19, i.e., the compiled version of the source code implementing the translator, and the translated code 21, i.e., the translation of the subject code 17 produced by the translator 19, run in conjunction with the operating system 20 such as, for example, UNIX running on the target processor 13, typically a microprocessor or other suitable computer. It will be appreciated that the structure illustrated in FIG. 1 is exemplary only and that, for example, software, methods and processes according to the invention may be implemented in code residing within or beneath an operating system. The subject code, translator code, operating system, and memory storage mechanisms may be any of a wide variety of types, as known to those skilled in the art.

In apparatus according to FIG. 1, program code conversion is preferably performed dynamically, at run-time, while the translated code 21 is running. The translator 19 runs inline with the translated code 21. The execution path of the translation process is a control loop comprising the steps of: executing translator code 19, which translates a block of the subject code 17 into translated code 21, and then executing that block of translated code 21; the end of each block of translated code 21 contains instructions to return control back to the translator code 19. In other words, the steps of translating and then executing the subject code are interlaced, such that only portions of the subject program 17 are translated at a time and the translated code 21 of a first basic block is executed prior to the translation of subsequent basic blocks. The translator 19's fundamental unit of translation is the basic block, meaning that the translator 19 translates the subject code 17 one basic block at a time. A basic block is formally defined as a section of code with exactly one entry point and exactly one exit point, which limits the block code to a single control path. For this reason, basic blocks are the fundamental unit of control flow.

In the process of generating the translated code 21, intermediate representation ("IR") trees are generated by the translator 19 based on the subject code 17 instruction sequence. IR trees are abstract representations of the expressions calculated and operations performed by the subject program. Later, translated code 21 is generated based on the IR trees. A method and apparatus for generating such IR trees are described, for example, in the co-pending U.S. patent application Ser. No. 10/439,966, entitled Block Translation Optimizations for Program Code Conversion and filed on May 16, 2003, the disclosure of which is hereby incorporated by reference.

After the IR tree is generated, the corresponding target code 21 is generated based on the IR. The process of generating target code 21 from a generic IR is well understood in the art. Target code 21 is inserted at the end of the translated block to save the abstract registers to the global register store 27. After the target code 21 is generated, it is then executed.

The translator 19 first generates translated code 21 based on the subject instructions 17 of a first basic block, then the translated code for the first basic block is executed. At the end of the first basic block, the translated code 21 returns control to the translator 19, which then translates a second basic block. The translated code 21 for the second basic block is then executed. At the end of the execution of the second basic block, the translated code returns control to the translator 19, which then translates the next basic block, and so forth.

Thus, a subject program running under the translator 19 has two different types of code that execute in an interleaved manner: the translator code 19 and the translated code 21. The translator code 19 is generated by a compiler, prior to run-time, based on the high-level source code implementation of the translator 19. The translated code 21 is generated by the translator code 19, throughout run-time, based on the subject code 17 of the program being translated.

The representation of the subject processor state is likewise divided between the translator 19 and translated code 21 components. The translator 19 stores subject processor state in a variety of explicit programming language devices such as variables and/or objects; the compiler used to compile the translator determines how the state and operations are implemented in target code. The translated code 21, by comparison, stores subject processor state implicitly in target registers and memory locations, which are manipulated directly by the target instructions of the translated code 21.

For example, the low-level representation of the global register store 27 is simply a region of allocated memory. This is how the translated code 21 sees and interacts with the abstract registers, by saving and restoring between the defined memory region and various target registers. In the source code of the translator 19, however, the global register store 27 is a data array or an object which can be accessed and manipulated at a higher level. With respect to the translated code 21, there simply is no high-level representation.

In some cases, subject processor state which is static or statically determinable in the translator 19 is encoded directly into the translated code 21 rather than being calculated dynamically. For example, the translator 19 may generate translated code 21 that is specialized on the instruction type of the last flag-affecting instruction, meaning that the translator would generate different target code for the same basic block if the instruction type of the last flag-affecting instruction changed.

Figure 2:
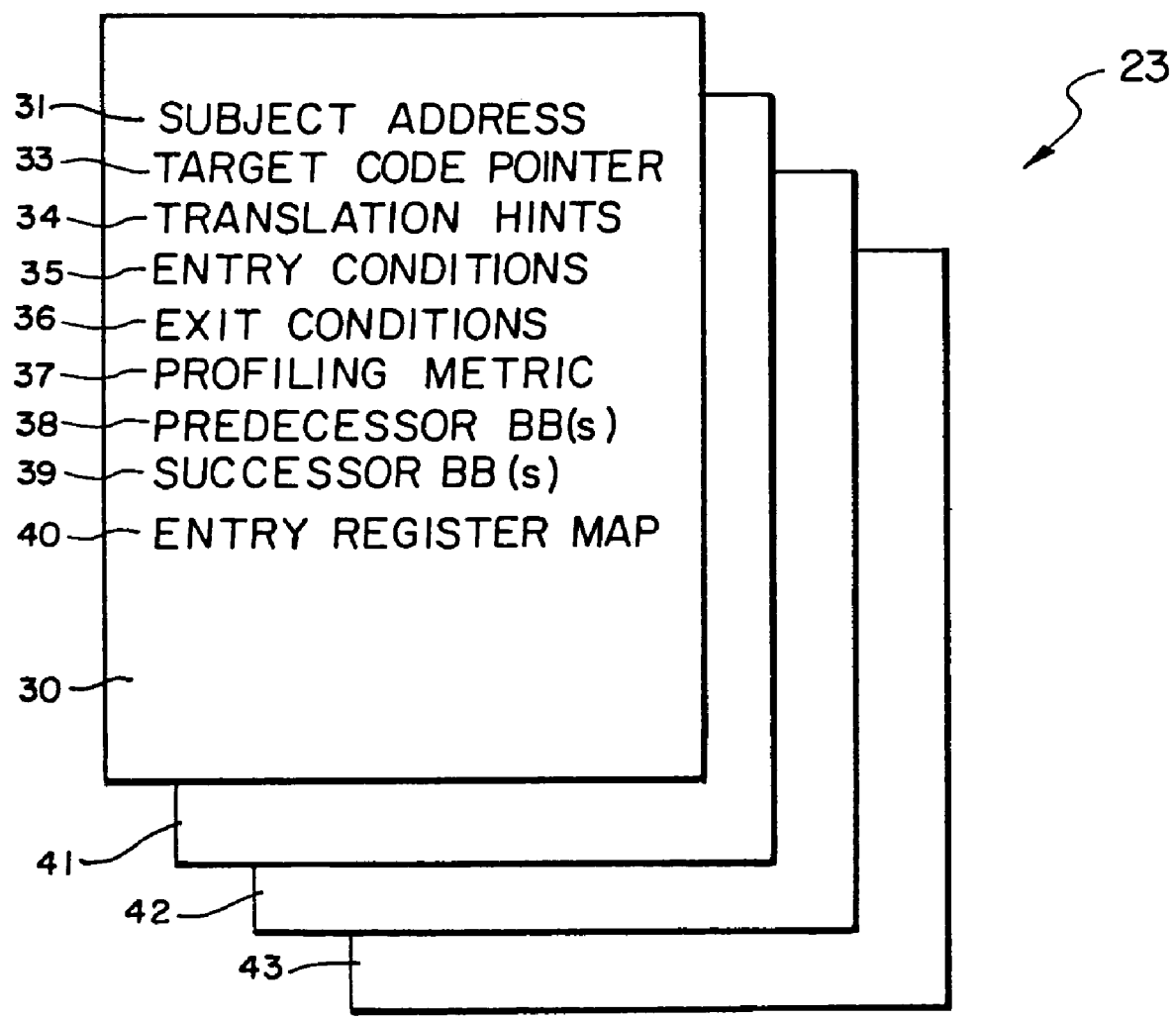
FIG. 2 is a schematic illustrating a basic block data structure and cache according to an illustrative embodiment of the invention.

The translator 19 contains data structures corresponding to each basic block translation, which are particularly useful in facilitating translation optimizations, such as extended basic block, isoblock, group block, and cached translation state optimizations described in U.S. patent application Ser. No. 10/439,966 and incorporated by reference above. FIG. 2 illustrates such a basic block data structure 30, which includes a subject address 31, a target code pointer 33 (i.e., the target address of the translated code), translation hints 34, entry and exit conditions 35, a profiling metric 37, references to the data structures of the predecessor and successor basic blocks 38, 39, and an entry register map 40. FIG. 2 further illustrates the basic block cache 23, which is a collection of basic block data structures, e.g., 30, 41, 42, 43, 44 . . . indexed by subject address. In one embodiment, the data structure corresponding to a particular translated basic block may be stored in a C++ object. The translator 19 creates a new basic block object as the basic block is translated.

The subject address 31 of the basic block is the starting address of that basic block in the memory space of the subject program 17, meaning the memory location where the basic block would be located if the subject program 17 were running on the subject architecture. This is also referred to as the subject starting address. While each basic block corresponds to a range of subject addresses (one for each subject instruction), the subject starting address is the subject address of the first instruction in the basic block.

The target address 33 of the basic block is the memory location (starting address) of the translated code 21 in the target program. The target address 33 is also referred to as the target code pointer, or the target starting address. To execute a translated block, the translator 19 treats the target address as a function pointer which is dereferenced to invoke (transfer control to) the translated code.

The basic block data structures 30, 41, 42, 43, . . . are stored in the basic block cache 23, which is a repository of basic block objects organized by subject address. When the translated code 21 of a basic block finishes executing, it returns control to the translator 19 and also returns the value of the basic block's destination (successor) subject address 31 to the translator. To determine if the successor basic block has already been translated, the translator 19 compares the destination subject address 31 against the subject addresses 31 of basic blocks in the basic block cache 23 (i.e., those that have already been translated). Basic blocks which have not been yet translated are translated and then executed. Basic blocks which have already been translated (and which have compatible entry conditions, as discussed below) are simply executed. Over time, many of the basic blocks encountered will already have been translated, which causes the incremental translation cost to decrease. As such, the translator 19 gets faster over time, as fewer and fewer blocks require translation.

Partitions

In a preferred embodiment, the translator 19 employs a technique to select sets of subject instructions, referred to hereafter as subject instruction groups (SIGs), in order that each SIG is associated with a distinct set of translator data structures (e.g., basic blocks) and translated target code 21. The combination of a SIG and it's associated translator data structures and target code 21 is hereafter referred to as a partition. A single SIG includes subject instructions in one or more ranges of subject addresses. Instructions from a single subject address or ranges of subject addresses may be included in several distinct SIGs. A translated block may only include translations from one SIG.

The partitioning technique utilized by the translator 19 divides the translator 19's representation of control flow into groups of subject instructions (SIGs) which are likely to be modified together. In some cases, these partitions correspond to the different libraries and object files that make up a subject program, such that partitions are created and replaced as libraries are mapped into subject memory and later discarded. The partitioning technique can be particularly useful to the translator 19 when translating subject programs that modify their own subject code 17, hereinafter referred to as "self-modifying." By dividing subject code 17 and its corresponding translated target code 21 into partitions, the affected partition or partitions can be discarded when their associated subject code is modified without affecting the valuable information (e.g., translations) built up in other partitions whose SIGs are not affected. Without the use of such partitions, all existing translations, even those not affected by the code modification, would need to be discarded in response to every code modification.

In a preferred embodiment, the translator 19 maintains segregated data structures, such that translation data structures are organized by SIGs into partitions. This segregation allows for the numerous block translations (and affiliated data structures) that are contained within a single partition to be discarded and freed at once, rather than traversing the underlying representations of translated code to search for affected translations and deleting them one at a time. For example, in one embodiment the translator 19 maintains a separate basic block cache 23 for each partition.

In a preferred embodiment, the translator 19 defines SIGs such that the subject addresses in a single SIG form a single contiguous range of addresses.

In another preferred embodiment, the translator 19 defines SIGs such that the subject addresses in a single SIG are composed of (1) a single range of contiguous addresses that are likely to be modified together, plus (2) additional ranges of addresses that are less likely to be modified. This allows the translation of a single block to include instructions from the range (1) and the ranges (2) and thereby form a more optimal translation.

Figure 3:
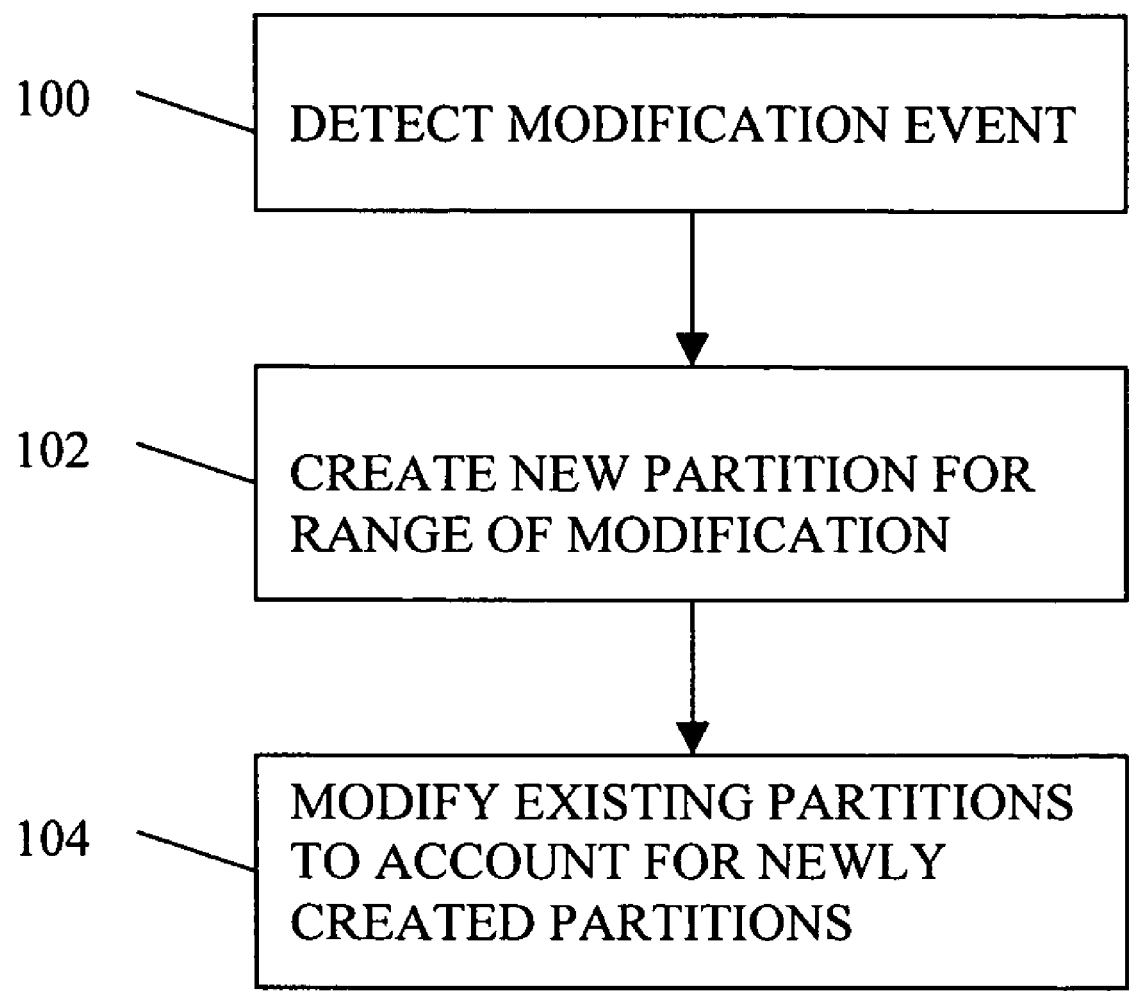
FIG. 3 is a flow diagram illustrating a partitioning technique employed during translation.

The steps implemented by the translator 19 in modifying partitions are illustrated in FIG. 3. When subject code 17 modifies other subject code, the "modification event" is detected in step 100 by the translator 19. A modification event is defined to correspond to a particular subject address range (the range of subject code that is overwritten, deleted or otherwise affected by the modification). The translator 19 must first detect when and where subject code is self-modified (i.e., which subject code performs the modification, and which subject code is modified). Modification events are any events which cause subject code 17 to be modified. Self-modifying code does not include cases in which subject code 17 modifies subject data. Self-modification of subject code 17 can take many forms, including but not limited to: (i) mapping a file into memory (e.g., mmap( ) system calls); (ii) removing a file from memory (e.g., munmap( ) system calls); and (iii) making a memory region executable (e.g., changing its permissions using the mprotect( ) system call).

In cases where subject code 17 modifications are made using a well known system call, such as mmap( ), munmap( ) or mprotect( ), the translator 19 may detect all calls to that system call in the subject code 17 in order to detect the modification event. The translator 19 can also detect subject code 17 modifications by other mechanisms. For example, many subject processors require that, prior to executing code that has been modified, the subject program must first flush the processor's instruction cache (I-cache). In particular, the PowerPC architecture has a special instruction for this purpose, "ICBI" (Instruction Cache Block Invalidate), while other architectures may use a special system call for the same purpose. On architectures with such a cache flush requirement, the translator 19 may detect modification events by detecting instances of the special instruction (or special system call).

In another preferred embodiment, the translator 19 uses features of the target operating system 20 to monitor all writes to target memory regions corresponding to subject code in order to detect modification events in step 100. On certain systems, the system call mprotect( ) allows the translator 19 to set particular regions of memory as being "read-only." Other systems may utilize equivalent functions to that of the mprotect( ) system call to define a particular area of memory as being read-only. Any attempt to write into read-only regions triggers a signal which is detected by the translator 19. The signal notifies the translator 19 that a subject code 17 modification is taking place, and the translator 19 uses the signal context to determine which subject addresses are being overwritten. After detecting the modification event and identifying the scope of the modification (i.e., the subject addresses affected), the translator 19 then allows the write to proceed normally.

In another preferred embodiment, the translator 19 generates a special target code sequence, for each translated memory write operation in the subject code 17, which checks if the write address corresponds to subject code 17 rather than subject data, in order to detect modification events in step 100.

Figure 4:
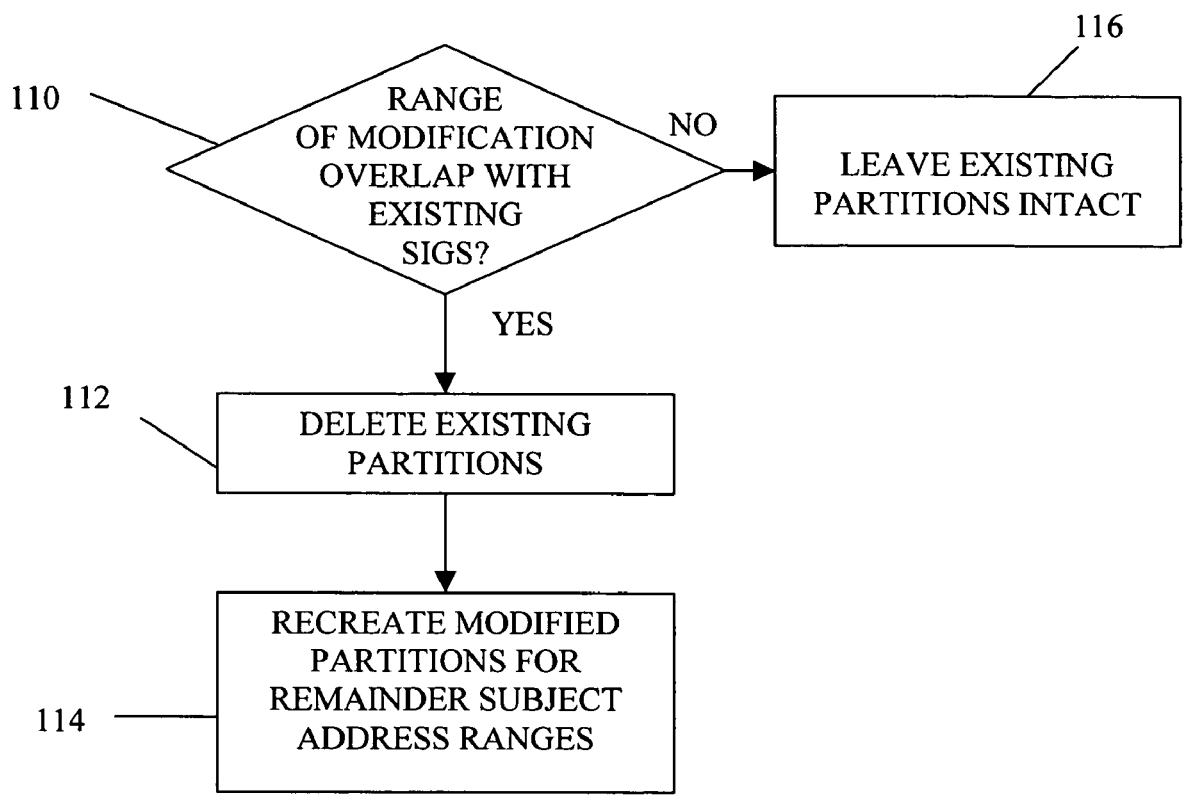
FIG. 4 is a flow diagram illustrating partition modification.

In each of the various embodiments of the present invention, after a modification event has been detected, the modification results in the creation of a new partition in step 102 whose SIG includes the subject instructions in the modified range. In addition, existing partitions are then modified in step 104 to account for the newly created partition. In modifying the existing partitions, the translator 19 implements the steps illustrated in FIG. 4. When the translator 19 creates a new partition as the result of a detected modification event, it is initially determined in step 110 whether the SIG of the newly created partition intersects with the SIG in any existing partitions. When no overlap with the SIG of an existing partition is found, the existing partitions are left intact in step 116. If any existing partitions had SIGs that included subject address ranges that intersected (overlapped) with the modified range, all such intersecting partitions are destroyed in step 112 and recreated in step 114, except in certain situations where additional partition optimizations are applied as described below. For each intersecting partition that is destroyed, a new remainder partition is created in step 114 for the remaining range or ranges of subject addresses in the original SIG, such that the new remainder partition contains the original SIG of the intersecting partition minus the intersecting modified range. When a partition is destroyed, all existing target code 21 translations associated with that partition are discarded. Each newly created partition is, at first, completely empty of translated target code 21, meaning that any subject code 17 subsequently encountered from the SIG of that partition must be translated from scratch.

Figure 5A:
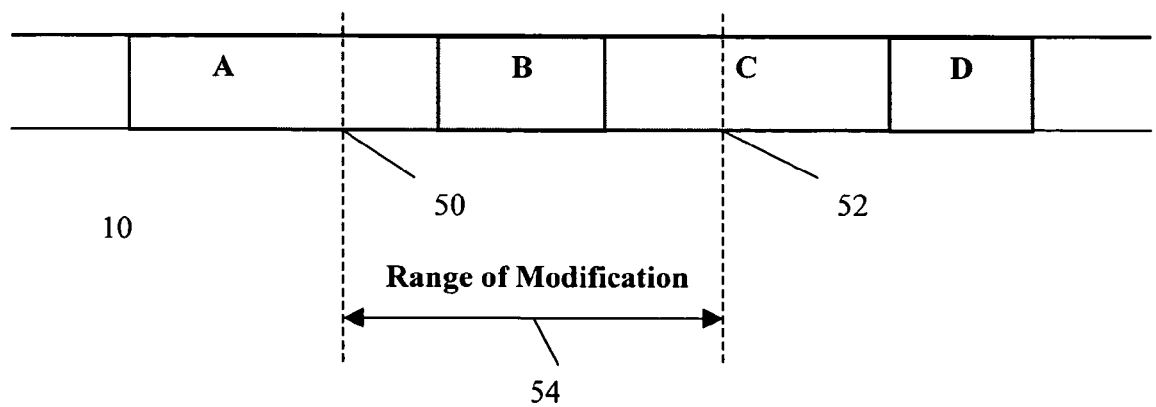
FIGS. 5A and 5B are schematic diagrams of an example illustrating the creation and modification of partitions in the partitioning technique.
Figure 5B:
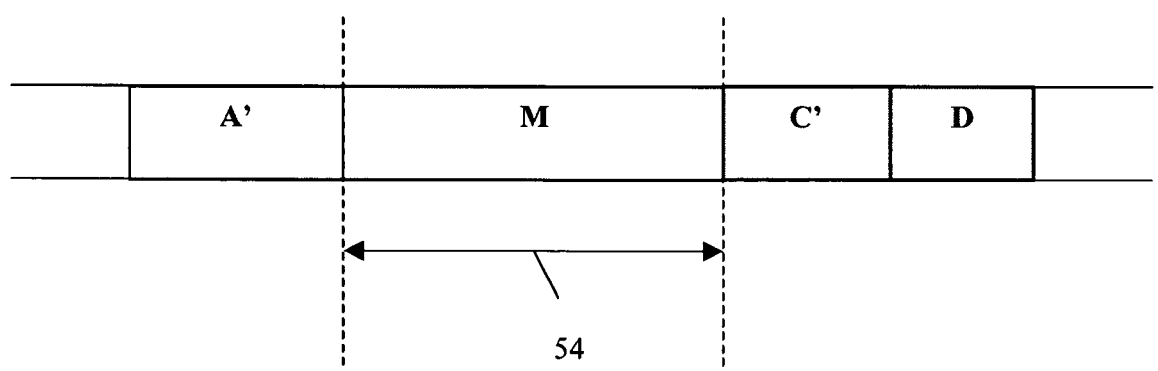

FIGS. 5A and 5B illustrate an example of the creation of a new partition from a set of existing partitions and a modification event which overlaps some of those partitions. For the purposes of providing a simple illustrative example, FIGS. 5A and 5B depict SIGs in which the set of subject instructions for each SIG forms a single contiguous range, but it is not essential to the technique for each SIG to contain a single continuous range. Prior to the modification, the SIGs of four partitions A, B, C and D exist in the subject address space as shown in FIG. 5A. The subject code 17 in this example then modifies a range of subject code addresses extending from point 50 in memory to point 52. The range of the modification 54 intersects with the SIGs for partitions A and C and totally encompasses the SIG for partition B. FIG. 5B illustrates the changes made to the existing partitions in response to the modification event. Partition M is created for the entire modified range 104. Partitions A and C are destroyed, and partitions A' and C' are created, respectively, for the remaining portions of A and C which do not intersect the modification range 104. Partition B is destroyed and its SIG is completely subsumed by the new partition M. Partition D, whose range does not overlap the modification range 54, remains unaffected.

In another preferred embodiment of the translator 19, a lazy partition allocation optimization technique is utilized by the partitioning technique in order to improve performance of the translator 19. In order to save memory, the full data structures of a partition are not allocated at the time when a partition is created. Instead, an inactive partition is initially created which reserves the partition's SIG, but the translator 19 does not initially allocate any of the underlying translation data structures and memory. In this manner, the initial inactive partitions are essentially empty skeleton partitions that merely reserve a particular SIG. The regions of the subject memory space which the translator 19 identifies as being modified by a modification event may in certain situations never actually be translated into target code 21. This may be because the subject memory region corresponds to data, or because the subject memory region corresponds to code which is never executed. The initial creation of the inactive or skeleton partition avoids the overhead of wasted memory resources.

When any subject code 17 within the SIG of a partition is actually translated, the inactive partition becomes a live or active partition and the partition data structures are initialized. Accordingly, modification events which correspond to data segments of the subject program (e.g., files which are mmap( )ed as data, and which the subject program never executes as code) cause a new inactive partition to be created, but none of the underlying translation data structures and memory regions are allocated. The partition's full data structures are only realized when translation occurs within the partition's range of subject addresses. Because inactive partitions contain no translations of subject code, they can be created, deleted, or resized without the memory and performance overhead associated with live partitions In certain situations, the translator 19 may allocate large regions of memory for new partitions to store target code 21 translations. Target code 21 is preferably allocated to be contiguous so as to avoid unnecessary fragmentation. The translator 19 is more likely to be able to make target code 21 contiguous if it has a large memory region to use. Partitions which are falsely detected (i.e., modification events in subject memory ranges which do not correspond to executable subject code) can sometimes consume valuable memory resources for no purpose. By only allocating translation data structures and memory when subject code 17 within a partition is actually translated (and executed), lazy partition allocation allows the translator 19 to avoid the negative impact of false positives from the modification event detection mechanism associated with partitioning.

In another preferred embodiment, the translator 19 possesses interpreter functionality to interpret subject code 17 rather than translate it. This allows the translator 19 to delay the translation of subject code 17 and thereby avoid the allocation of partitions associated with that subject code 17. A translation method and apparatus which facilitates such interpreter functionality is described in co-pending U.S. patent application Ser. No. 10/732,764, entitled "Method and Apparatus for Performing Interpreter Optimizations during Program Code Conversion," filed on Dec. 10, 2003, the disclosure of which is hereby incorporated by reference.

In another preferred embodiment, the translator 19 applies a reducible partition optimization technique to the partitioning process in order to improve performance of the translator 19, where the SIG of a partition is reduced, rather than deleting the partition in response to a modification event, to a smaller SIG that includes the set of addresses actually used in the partition. The reduced smaller SIG does not include the range defined by the modification event. Initially in response to the detection of a modification event, a new partition is created with a SIG including a range with a starting address and an ending address whose values are defined by the scope of the modification. However, in operation, the actual range of subject addresses that are translated may be narrower than the defined range of the partition. The SIG encompassing all subject addresses within a partition that have actually been translated or which are flagged for future translation is referred to as the "active SIG" or used SIG of a partition. The remaining SIG of subject addresses in a partition that have not been translated is referred to as the "inactive SIG." In order to optimize the performance of the translator 19, the extent of the SIG of a partition may be reduced, from its initially defined set of addresses to a lesser set which includes its active range of addresses in the active SIG by eliminating at least a portion of the inactive range of addresses corresponding to the intersection between the inactive SIG and the range of the modification.

While the concept of reducible partitions may be implemented in any number of ways, in one preferred embodiment, the translator 19 maintains the active range or translated range of addresses in the SIG of each partition. When a partition is created, its active SIG is initially empty. During translation, as each subject instruction is translated, its subject address ("the translated address") is compared to the active SIG of the current partition. If the translated address is outside the current active SIG, the active SIG is expanded to include the translated address. As such, the active SIG will grow as translation of the subject code progresses.

Figure 6:
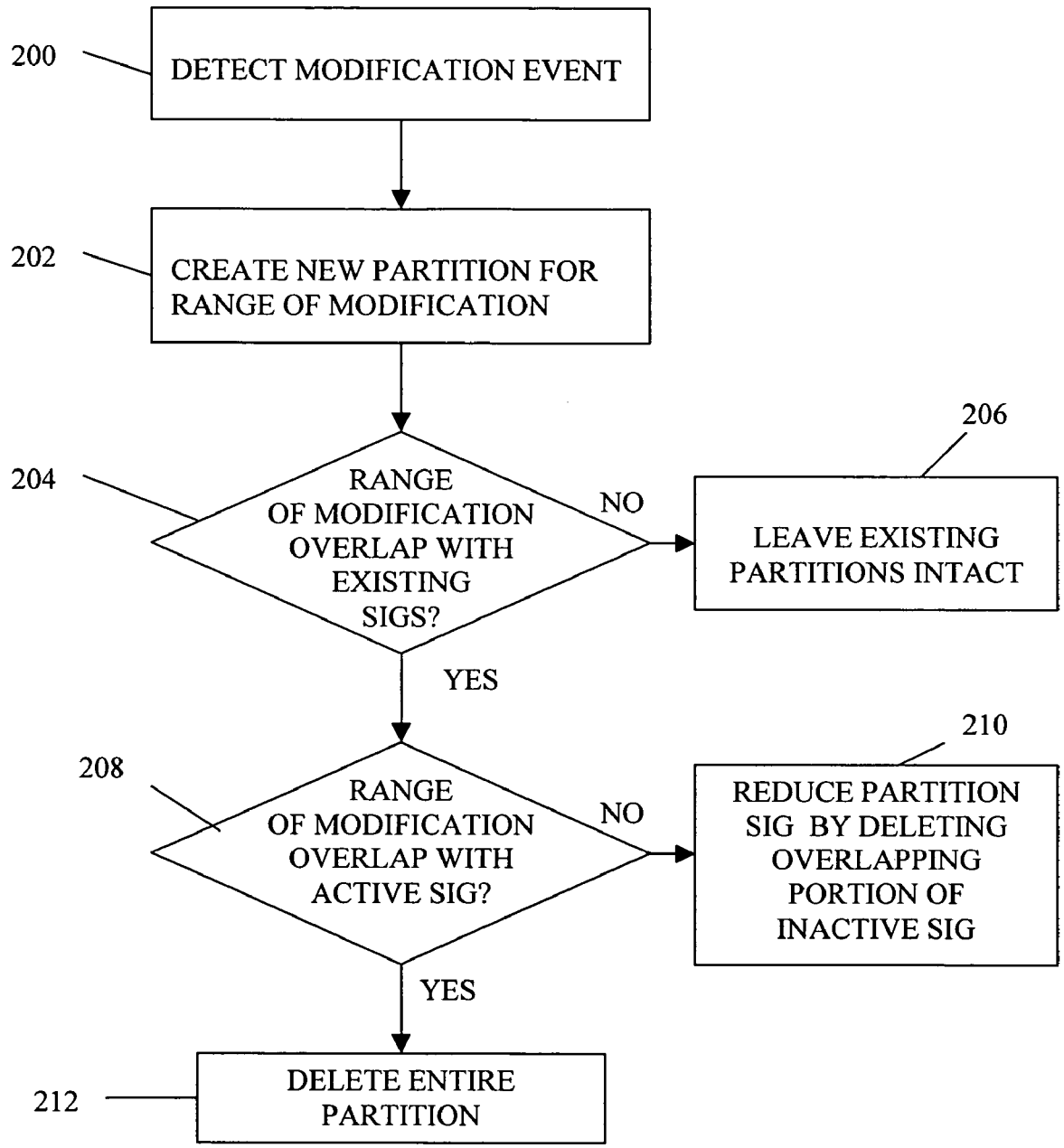
FIG. 6 is a flow diagram illustrating a reducible partition optimization technique.

In performing the reducible partition optimization technique, the translator 19 implements the steps illustrated in FIG. 6. When the translator 19 detects a modification event in step 200, a new partition is created in step 202 with a SIG including the range of the modification. The translator 19 then determines in step 204 if the range of the modification overlaps the initially defined SIG of an existing partition. When no overlap is found, already defined existing partitions are left intact in step 206. If an overlap exists, the translator 19 then determines in step 208 whether the modification range actually overlaps the partition's active SIG. If the modification range does not overlap the active SIG, then the translator 19 can simply resize the partition's initially defined SIG in step 210 without deleting the translation data structures within the partition. The reason is that, while the initially defined partition SIG represents the potential scope of the partition, as defined by the prior modification event which created the partition, the active SIG represents the actual set of subject addresses translated. Modifications which do not overlap the active SIG therefore do not invalidate any of the translations within the partition, because the translator 19 knows that the translated subject addresses are distinct from, and therefore unaffected by, the modified subject addresses. By resizing the SIG of a partition to include at least the active range, the translations stored within the partition can be kept in that partition and need not be deleted. On the other hand, if the modification range does overlap the partition's active SIG, then the translator 19 must delete the entire partition in step 212 as described above.

Figure 7A:
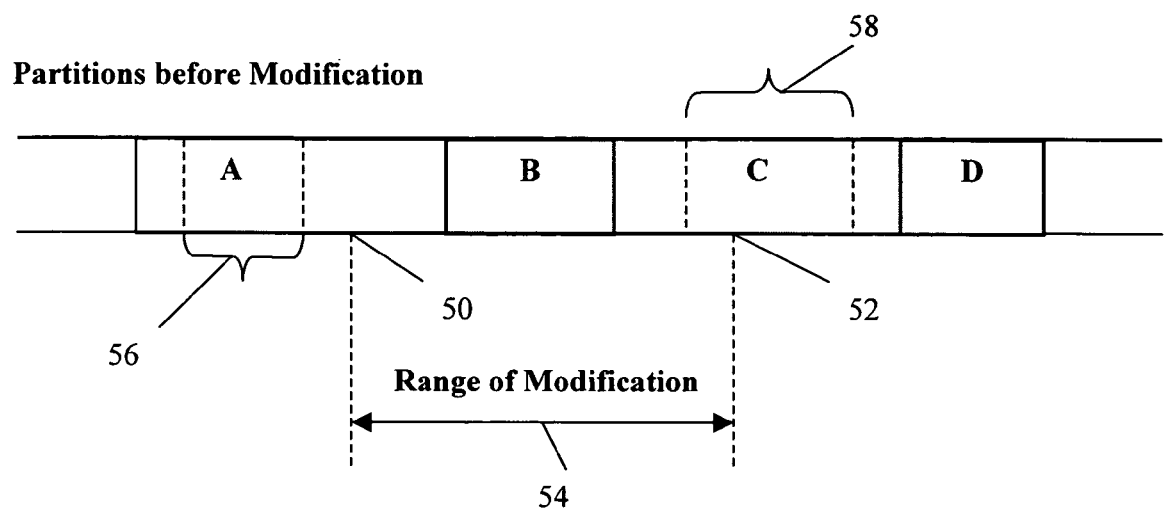
FIGS. 7A and 7B are schematic diagrams of an example illustrating the creation and modification of partitions using a reducible partition optimization technique.
Figure 7B:
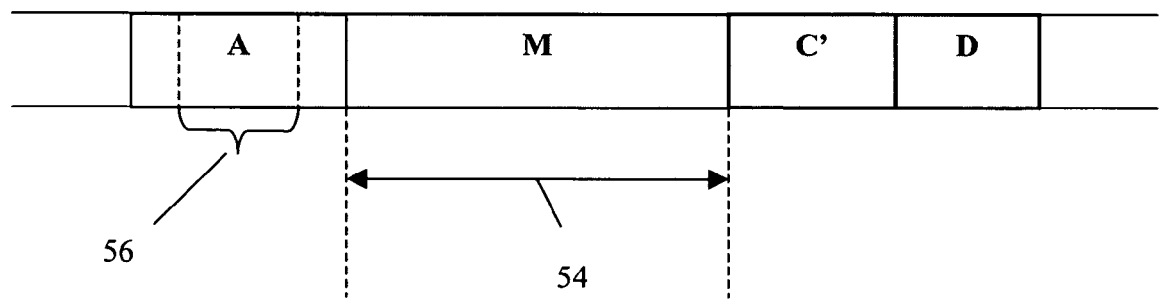

Referring now to FIGS. 7A and 7B, an illustration of the reducible partition optimization technique is provided. The partitions illustrated in FIGS. 7A and 7B are substantially the same as those shown in FIGS. 5A and 5B, except that partitions A and C include active ranges of subject addresses 56 and 58, respectively. Prior to the modification, four partitions A, B, C and D exist, as shown in FIG. 10A. The subject code then modifies a range of subject code addresses extending from point 50 in memory to point 52. The range of the modification 54 intersects with the initially defined partition range for partition A, but the range of modification does not intersect with the active range 56 of partition A. FIG. 7B illustrates the changes made to the existing partitions in response to the modification event. After partition M is created for the modified range 54, the range of partition A can be reduced without affecting the translations in partition A. Contrarily, it can be seen in this example that the range of modification 54 intersects with the active range 58 of partition C. Thus, the range of partition C can not simply be reduced and partition C must be destroyed, whereupon new partition C' is created for the remaining portion of partition C which is not intersecting with the range of modification 54. Partition B is destroyed and its range is completely subsumed by the new partition M. Partition D remains unaffected.

Figure 8A:
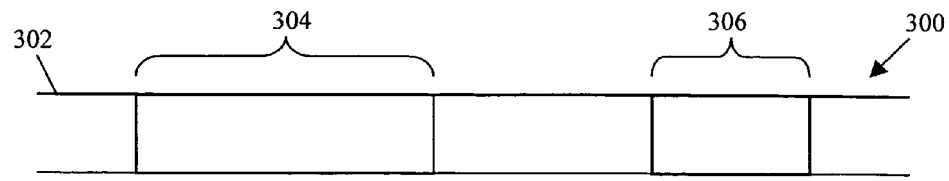
FIGS. 8A-8E are schematic diagrams of an example illustrating the creation and modification of a partition having active and inactive SIG ranges using a reducible partition optimization technique.
Figure 8B:
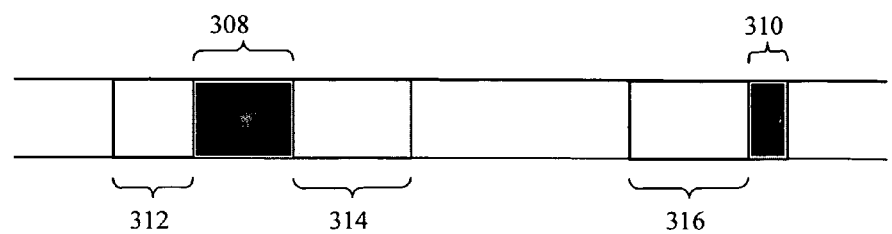
Figure 8C:
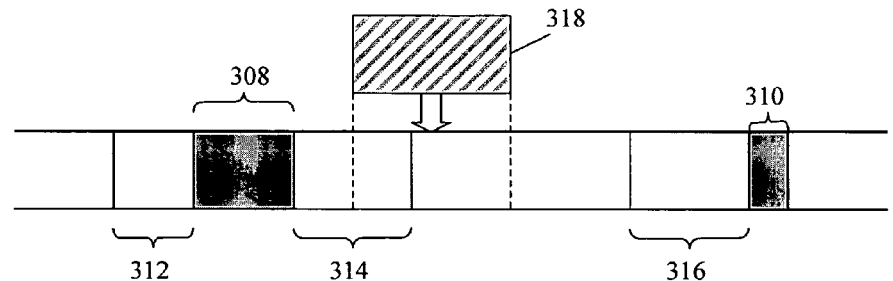
Figure 8D:
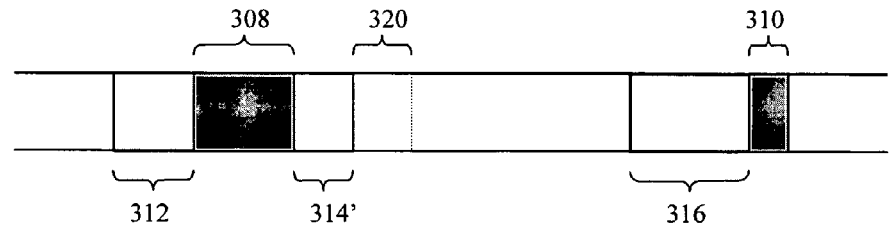
Figure 8E:
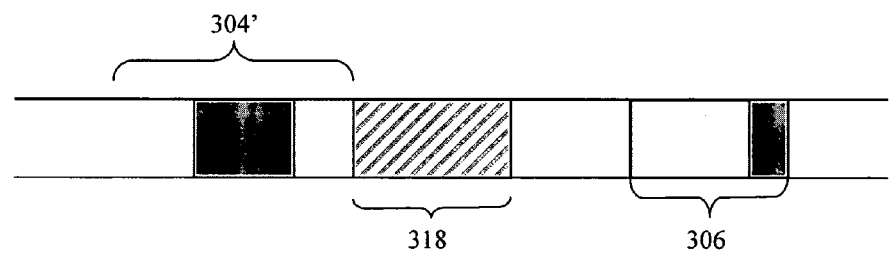

Referring to FIGS. 8A-8E, an illustration of the reducible partition optimization technique is provided in which a SIG 300 exists which contains multiple active and inactive ranges. FIG. 8A illustrates the initially defined SIG 300 as it appears in the subject address space 302. The SIG 300 includes two ranges of subject code addresses 304 and 306. As shown in FIG. 8B, each of the subject code address ranges 304, 306 includes an active range of subject code addresses 308, 310, respectively. The remaining subject addresses in the SIG 300 are inactive subject code addresses located in inactive ranges 312, 314, and 316. Upon the occurrence of a modification event, the subject code then modifies a range of subject code addresses to create a new SIG 318 as illustrated in FIG. 4C. The range of the newly created SIG 318 intersects with the initially defined subject code address range 304 of SIG 300, where the range of SIG 318 does not intersect with its active range 308 but only its inactive range 314. After determining the scope of the range of SIG 318, the subject address range 314 can be reduced as shown in FIG. 4D without affecting the translations in the active range 308 of SIG 300. The inactive range 314 is reduced by removing the subject addresses in the range of intersection 320 with the SIG 318 to produce a reduced inactive range 314'. FIG. 4E illustrates the changes made to the initially defined subject address ranges 304, 306 of SIG 300 in response to the modification event. As can be seen, initially defined subject address range 304 is reduced as described above to subject address range 304' which includes active range 308 and inactive ranges 312, 314'. Subject address range 306 remains unaffected by the creation of new SIG 318.

The translator 19 can detect most modification events at decode-time, but the actual subject addresses to be modified may not be known until the translated code 21 is executed. Thus, when the translator 19 detects during decoding either a subject code 17 modification or an indication that a modification has occurred, the translator 19 ends the translation of the current block, and inserts a notification immediately after the current block to notify the translator of the modification event.

In one embodiment of the translator 19, the partitioning technique is implemented in the translator 19 with the aid of special blocks. Special blocks are blocks which, while they may correspond to a particular subject address do not represent translations of subject code. In contrast, a translation block represents a translation of a particular subject code sequence beginning with a particular starting subject address. Instead, special blocks contain special actions of the translator 19 which are inserted into the stream of target code during translation, before the blocks are actually executed. In effect, special blocks are special translation structures that perform lightweight translator actions, which can be planted at particular points in the target code control flow without requiring an expensive context switch out of target code back to the translator loop.

Special blocks contain pseudo-target code rather than normal target code. Normal target code represents a translation of some subject code sequence. Pseudo-target code consists of artificial (i.e., not translated) target code sequences, which is either written directly in target code or written in a high-level programming language (e.g., C++) and compiled to have the same calling conventions as target code generated by the translator 19. Examples of special blocks include notifyBlocks and border guard blocks, which are discussed herein.

In a preferred embodiment, the translator 19 inserts a special block called a "notifyBlock" into the control flow of the translated program at a point immediately following the block containing the self-modifying subject code. The notifyBlock is a "special" translation structure, because unlike a translation block it does not represent the translation of any particular subject code, but rather it represents the modification event. The subject code 17 which actually performs the modification is translated as part of the current block. The notifyBlock is inserted as the successor of the current block. Thus, immediately after the modification is performed in the translated current block, the subsequent notifyBlock notifies the translator 19 to perform the appropriate actions in response to that modification (i.e., partition adjustments). The subject code 17 that follows the modification event is translated in a new block, which becomes the successor of the notifyBlock.

When the notifyBlock is reached in the target code 21 at run-time, the translator 19 is notified of the subject address range of the modified code. The translator 19 uses this information to create a new partition, which may also alter or destroy existing partitions as described above.

The block containing the self-modifying subject code (the predecessor of the notifyBlock) ends immediately after identifying a modification event because the modification may invalidate the current partition. The modified subject code might be the next subject instruction, which would require the translator to translate and execute the newly modified version of that instruction rather than executing an existing translation of the old version. For example, on the PowerPC architecture, a block must end after a cache flush instruction. Thus, when a modification event is detected, the current block of translation is ended and a notifyBlock is inserted as the successor.

The notifyBlock also passes a copy of the current subject address and compatibility list from its predecessor block to its successor block. After the notification occurs, translation resumes in the successor block at the next subject instruction. If the current partition is destroyed as a result of the operation, the notifyBlock also handles the safe transition into the new partition which replaces it, using the copied subject address and compatibility list to initialize the successor block in the new partition. This avoids the problem of referring to data which may have become deleted during the transition to the new partition.

Translation blocks must end at partition boundaries, such that the creation of partitions can have a negative impact on optimizations which could otherwise be performed on large sections of code. Sections of code which would otherwise be translated together are translated as separate blocks due to the partitions formed, thus reducing the scope of the optimizations and increasing the number of returns to the translator loop. For example, optimizations, such as the extended block and group block optimizations described in co-pending U.S. patent application Ser. No. 10/439,966 and assigned to the same assignee as the present invention and hereby incorporated by reference herein, are limited by partition boundaries. For this reason, one optimization that can be applied to the present partitioning technique in order to improve performance of the translator 19 is, for subject programs that are known not to modify their own subject code 17, aggregating all subject memory into a single partition such that all subject code 17 is contained in one partition.

Subject memory aggregation can be implemented in a number of manners. In one approach, a set of libraries that are known not to be modified in normal operation are aggregated into a single partition. Remaining libraries that are required by the subject program that are not part of this immutable set are placed into separate partitions as normal. This allows the translations in the immutable partition to be translated more efficiently, while maintaining the ability to respond to subject code modification of the remaining, possibly mutable, libraries and other subject code.

In another approach to subject memory aggregation, a region (1) of subject addresses enclosing a set of subject code which is known not to be modified in normal operation is added to the SIGs of all partitions which separately contain other regions (2) which may be mutable, which allows the translation of control flow which passes from the possibly mutable region of the partition into the immutable region to be generated more optimally, while maintaining the ability to respond to subject code modification of the mutable regions of the partition. If a subject code modification occurs that encompasses the whole of region (2) of the partition, the partition will be deleted in it's entirely in order to save memory.

The scope of a partition must be properly defined, because the partition scope impacts the performance of the translator 19. If partitions are too small, control flow must constantly pass through border guards (described below). If partitions are too large, a slight code modification will unnecessarily invalidate larger portions of translated code. A proper balance of such constraints should be considered when selecting partition size as it relates to the performance of the translator 19. Optimizations can be applied to the partitions if it is determined that the particular partitions being generated have a negative impact on performance. By default, partition size is determined by the modification event detection mechanism. For example, if the translator 19 detects an mmap( ) of a run-time library, a new partition is created that encompasses the entire library.

One optimization technique that can be applied to partitioning in order to improve performance of the translator 19 is the aggregation of partitions. For example, the PowerPC ICBI cache flush instruction invalidates one page of executable memory. However, if multiple pages of subject code 17 are modified at once, the subject program may contain several consecutive ICBI instructions which invalidate contiguous pages of memory. Under the partitioning mechanism described above, this would result in multiple, contiguous, page-wide partitions. As such, one optimization of the partition mechanism is to detect consecutive cache flush instructions and coalesce the modified ranges into the SIG of one "aggregated" partition.

In one embodiment implementing the partition aggregation optimization, when a new partition is created, the translator 19 checks if there is an existing partition (i.e., not a remainder partition created as a byproduct of the new partition's creation) that has a SIG that is adjacent to and precedes the new partition's SIG in the subject code. If so, the range of the preceding existing partition's SIG can be expanded to include the range of the new partition's SIG, effectively aggregating the two partitions. The new partition need not have a separate representation after the aggregation has occurred.

Border Guards

In a preferred embodiment, the translator 19 inserts an additional level of indirection for control flow that travels between partitions. The translator 19 uses special placeholders, referred to herein as border guards, for blocks that touch partition boundaries, so that predecessor blocks can check if previously translated successor blocks still exist. With this approach, predecessor blocks can be efficiently notified when their successors are deleted. The translator 19 inserts a pair of border guard structures at every point where the subject program's control flow crosses a partition boundary, otherwise referred to as border crossings. The pair of border guards includes an exit border guard and an entry border guard. An exit border guard is a special block which is added after, and in the same partition as, the predecessor block. An entry border guard is a data structure which connects the corresponding exit border guard block to the successor block. For translated blocks within the same partition, control flow passes directly from the predecessor block to the successor block. For blocks in different partitions (i.e., border crossings), control flows from the predecessor block to an exit border guard, then using the entry border guard to locate the successor block, the exit border guard passes control to the successor block.

Entry border guards serve as placeholders for the translator 19, where entry border guards store references to their exit border guard counterparts. The data structure of each exit border guard also contains a reference to its entry border guard counterpart. The execution of an exit border guard verifies that a previously instantiated successor block still exists. Border guard blocks serve a bookkeeping function by providing an explicit representation of partition crossings. When the translator 19 deletes a particular partition, it traverses every entry border guard within that partition to find the corresponding exit guards. As the partition is deleted, the counterpart reference of each such exit border guard is set to null. In some embodiments, the translator 19 stores all of the entry border guards for a given partition together, such that they can be traversed efficiently when the partition is deleted. For example, in one embodiment, the translator 19 maintains an entry border guard list for each partition, wherein such list is updated whenever entry border guards are created or deleted.

Accordingly, when an exit border guard is executed, it verifies that its successor still exists by simply checking its own counterpart reference. If the reference is defined, then a valid translated successor exists and control passes via the respective entry border guard into the successor block, (and thereby to the successor partition). If the reference is undefined, then the exit border guard is unaware of a valid translated successor block, meaning that either there was one and it was deleted or this exit border guard has never been executed and therefore the successor has never been determined. If the counterpart reference is undefined, a new entry border guard and successor block are obtained by either checking the basic block cache of the respective partition or translating the successor block. From the exit border guard's perspective, a successor block that was translated and subsequently deleted is indistinguishable from a successor block that has never been translated.

The explicit representation of partition border crossings achieved by the border guard pair makes the process of partition deletion more efficient. To delete a partition, the translator 19 must identify and nullify all references to deleted blocks (i.e., previously translated blocks within the deleted partition). Absent some bookkeeping mechanism, such as border guards, the translator 19 would need to traverse numerous translated blocks to identify which blocks had successors in the deleted partition, in order to remove the references to those discarded successors. In addition to making the process of deleting a partition more efficient, border guard blocks facilitate thread-safe border crossings, as discussed below with respect to multithreaded programs.

To delete a partition in the presence of border guards, the translator 19: (i) voids the counterpart links of all exit guards that point to the partition to be deleted, and (ii) notifies all successor partitions of the partition to be deleted that their corresponding entry guards can be discarded, and (iii) deletes all translation structures and target code 21 belonging to the deleted partition. In the first step (i), the translator 19 traverses all of the entry border guards in the partition, and resets their foreign exit border guard counterparts, effectively notifying all predecessor partitions that the deleted partition is void. In the second step (ii) of partition deletion, all of the exit border guards in the partition are traversed to notify the successor partitions that their corresponding entry guards can be discarded. In one embodiment, the second step is performed by traversing each exit border guard of the deleted partition. In another embodiment, all of the entry guards in a partition are indexed by the predecessor partition which contains the corresponding exit guard. In this case, the deleted partition need only notify each successor partition once, and each successor partition can then identify the corresponding entry points to be deleted.

Multithreaded Programs in Partitioning

Multithreaded subject programs present a difficulty to the translator 19 when utilizing partitioning, namely the deletion of partitions must be performed in a thread-safe manner. Specifically, while a given partition is being deleted, threads must be prevented from entering that partition. This guarantees that control always flows into valid translations, and never into a deleted or invalid block. After a partition has been deleted and recreated, threads may then be allowed to enter the (newly emptied) partition.

In a preferred embodiment, the translator 19 uses a single global mutex ("the global partition lock") to serialize particular partition operations, including: (i) control flow jumps between partitions (i.e., border crossings); and (ii) deletion, and where applicable re-creation, of partitions. Thus, an exit border guard must acquire the global partition lock before control passes to its corresponding entry border guard. Likewise, a notifyBlock must acquire the global partition lock before destroying a partition. For modification events that require the deletion and subsequent re-creation of one or more partitions, all such deletions and re-creations are performed atomically under the protection of the global partition lock, meaning that all such operations are performed in sequence without releasing the lock. The translator 19 maintains a partition identifier for each thread, which is changed when control passes between partitions. This change is made by a border guard pair while holding the global partition lock.

In another preferred embodiment, the translator 19 uses a single global mutex ("the global partition lock") to serialize particular partition operations: (i) creation of entry border guards; and (ii) deletion, and where applicable, re-creation, of partitions. Thus, an exit border guard must acquire the global partition lock before it can obtain a new entry border guard and successor block, or re-create a previously deleted entry border guard and successor block. In the event of partition deletion, the notifyBlock obtains the global partition lock before deletion, and then the deletion mechanism first performs operation of traversing its collection of entry border guards in order to remove the counterpart references from the corresponding exit blocks. This requires that an individual counterpart reference can be safely unlinked in the presence of other threads of execution. Once all of the entry border guards have had this operation applied, the rest of the deletion operation must complete and the global mutex be released before any of the exit border guards so modified can obtain a new successor in the SIG owned by the deleted partition.

Figure 9A:
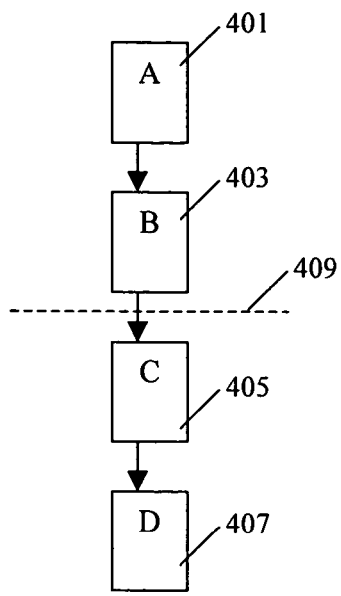
FIGS. 9A and 9B are schematic diagrams of an example illustrating control flow between partitions by the translator of the present invention.
Figure 9B:
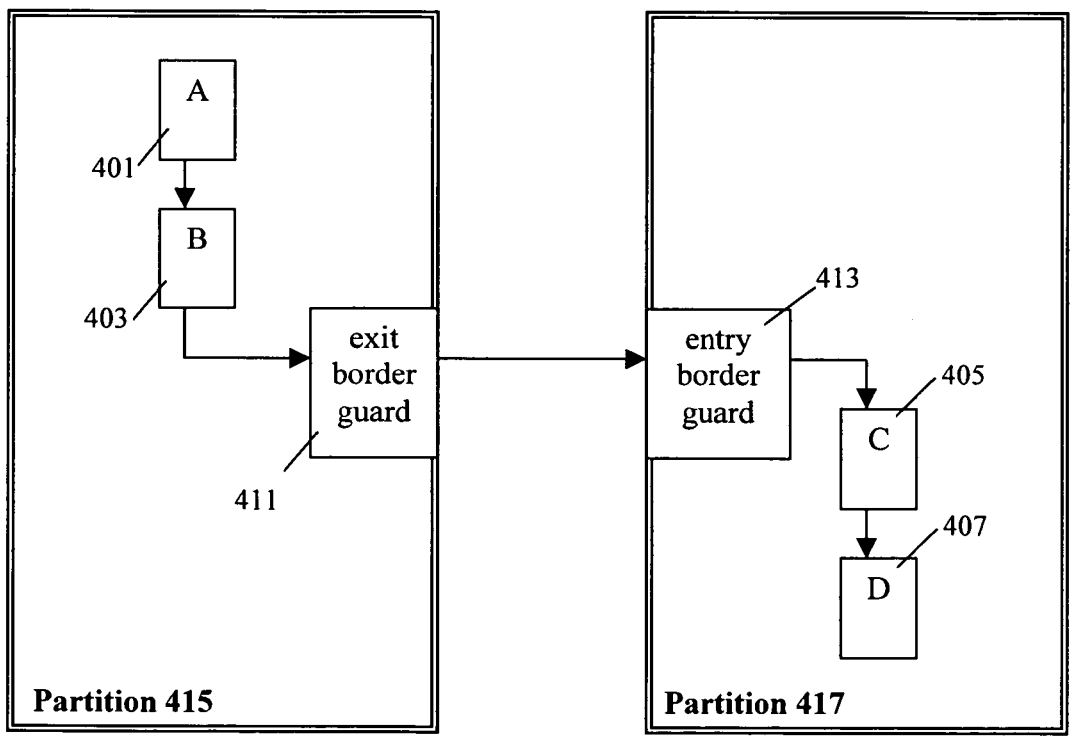

Referring now to FIGS. 9A and 9B, the control flow of a translated program across partition boundaries is illustrated, both with and without crossing a partition boundary. FIG. 9A shows the control flow of a particular subject program in the translator 19 when partitioning is not being employed or when control flow remains within a single partition. Control passes from subject block A 401 to subject block B 403, then to subject block C 405, then to subject block D 407. In terms of the program subject code, block B 403 is block A's 401 successor, block C 405 is block B's 403 successor, and block D 407 is block C's 405 successor.

In the situation where a partition boundary 409 existed or was created between subject block B and subject block C of FIG. 9A, control would necessarily flow through a border guard pair when crossing the partition boundary 409, as illustrated in FIG. 9B. Blocks A 401 and B 403 are both in partition 415, while blocks C 405 and D 407 are both in partition 417. In the translated subject program, control passes directly from block A 401 to block B 403, because blocks A 401 and B 403 are in the same partition 415. The transfer of control from block B 403 to block C 405, however, crosses a partition boundary. As such, control passes from block B 403 to an exit border guard block 411. As described above, the exit border guard 411 checks that its corresponding entry border guard 413 has not been deleted. In a multithreaded program (discussed below), the exit border guard also acquires the global partition lock, so that the partition boundary can be crossed in a thread-safe manner. Control then passes from the exit border guard block 411 to its corresponding entry border guard 213. Execution has now passed into partition 417. In a multithreaded program (discussed below), the entry border guard changes the partition identifier of the current thread to reflect the fact that the thread is now in partition 417 and the global partition lock is then released. Once inside partition 417, control passes from the entry border guard 413 to block C 405, and then directly from block C 405 to block D 407.

Memory Management

Memory management is a critical consideration in the various embodiments of the dynamic binary translator 19. The memory demands of translating a program for execution on one architecture to allow execution on another architecture are high. The memory demands become even higher when optimizations, such as isoblocks, extended blocks, and group blocks, as described in co-pending U.S. patent application Ser. No. 10/439,966, are introduced, as each of these optimizations creates the possibility that one sequence of subject code 17 may be represented by multiple translations. A modification event requires deletion of a partition, and therefore the deletion of all translation data (i.e., block structures and target code) therein.

In a preferred embodiment, the translator 19 provides its own memory management subsystem which mirrors the subject code partitions. Partitions are intended to group all translator data structures by the subject code 17 regions to which they correspond. Portions of subject code 17 that are likely to be invalidated together form a partition: all related translator data structures therefore reside in the same well-defined region of target memory. If a partition is invalidated, all of the translation data (translator structures and target code) associated with that partition can be freed en masse, avoiding the need to free every structure individually.

In this specific embodiment, the translator 19 performs all memory allocation through memorySource objects. Each partition has one corresponding memorySource. MemorySources obtain memory from the operating system through conventional means such as mmap( ) system calls, but they do so in bulk. Other translator code (including pseudo-target code) obtains memory as needed (i.e., in smaller quantities), but from per-partition memorySources rather than directly from the operating system. This improves the performance of the translator 19 by reducing the number and frequency of underlying memory-related system calls. MemorySources also provide a function for flushing the entire contents of the memorySource at once. The memorySource can implement a flush by actually freeing the underlying memory or by simply discarding all of the "allocations" it has made from that memory (i.e., wiping the slate clean while retaining the underlying memory).

The memory subsystem of the translator 19 also simplifies the process of deleting a partition. To delete a partition, the translator 19 must: (i) void the counterpart links of all predecessor partitions' exit guards; (ii) notify all successor partitions that their corresponding entry guards can be discarded; and (iii) delete all translation structures and target code belonging to the partition. Without the memory subsystem, the third step (iii) requires that the translator traverse the per-partition collections of translation structures and target code to free each structure individually. With the memory subsystem, all of the partition's structures can be freed at once by simply flushing the memorySource.

What is claimed:

1. A method for generating a translation of subject code into target code, comprising:
   identifying a block of self-modifying subject code within a block of subject code;
   identifying one or more blocks of non-self-modifying code within the block of subject code;
   partitioning the block of subject code, comprising:
      generating a first partition in the subject code such that the first partition includes the identified block of self-modifying subject code;
      generating one or more additional partitions in the subject code such that each additional partition includes one of the identified blocks of non-self-modifying subject code, respectively, wherein subject code in each of the first partition and the one or more partitions do not overlap;
   translating the first partition into a first block of target code;
   translating the one or more additional partitions into a corresponding number of additional blocks of target code; and
   combining the first block of target code and the additional blocks of target code to produce a translated target code.

2. The method of claim 1, further comprising:
   detecting a modification in the block of self-modifying subject code;
   translating the first partition, including the modification, to produce a modified block of target code; and
   combining the modified block of target code and the additional blocks of target code to produce a modified translated target code.

3. The method of claim 1, further comprising:
   detecting a modification in the block of self-modifying subject code;

detecting that the modification has modified a block of code corresponding to a second partition of the one or more additional partitions;

modifying the first partition by adding the block of code corresponding to the second partition to produce a modified first partition;

modifying the second partition by removing the block of code corresponding to the second partition to produce a modified second partition;

translating the first and second modified partitions to produce a first and second modified blocks of target code, respectively; and combing the first and second modified blocks of target code and the additional blocks of target code, but not a block of target code corresponding to the second partition, to produce a modified translated target code.

4. The method of claim 1, further comprising:

identifying two partitions of the first and additional partitions that are stored adjacently in a memory and that have characteristics that allow them to be combined;

aggregating the two partitions into a single combined partition;

translating the combined partition to produce a modified combined block of target code; and combining the first block of target code, the additional blocks of target code and the modified combined block of target code, without blocks of target code corresponding to the two partitions, to produce a modified translated target code.

5. The method of claim 1, further comprising:

identifying a control flow instruction in the block of self-modifying subject code or in the one or more blocks of non-self-modifying subject code; and inserting an exit translation structure, representative of the control flow instruction, into a block of code in which the control flow instruction was identified.

6. The method of claim 5, further comprising:

identifying a block of code as a target of the control flow instruction; and inserting an entry translation structure into the block of code identified as the target of the control flow instruction.

7. The method of claim 6, further comprising:

inserting, into the block of code in which the control flow instruction was identified, a first border guard corresponding to the exit translation structure; and inserting, into the block of code identified as the target of the control flow instruction, a second border guard corresponding to the entry translation structure.

8. A computer programming product, comprising:

a computer-readable memory, executable on a processor; and logic, stored on the computer-readable memory and executed on the processor,
for:
identifying a block of self-modifying subject code within a block of subject code;

identifying one or more blocks of non-self-modifying code within the block of subject code;

partitioning the block of subject code, comprising:

generating a first partition in the subject code such that the first partition includes the identified block of self-modifying subject code;

generating one or more additional partitions in the subject code such that each additional partition includes one of the identified blocks of non-self-modifying subject code, respectively, wherein subject code in each of the first partition and the one or more partitions do not overlap;

translating the first partition into a first block of target code;

translating the one or more additional partitions into a corresponding number of additional blocks of target code; and combining the first block of target code and the additional blocks of target code to produce a translated target code.

9. The computer programming product of claim 8, the logic further comprising logic for:

detecting a modification in the block of self-modifying subject code;

translating the first partition, including the modification, to produce a modified block of target code; and combining the modified block of target code and the additional blocks of target code to produce a modified translated target code.

10. The computer programming product of claim 8, the logic further comprising logic for:

detecting a modification in the block of self-modifying subject code;

detecting that the modification has modified a block of code corresponding to a second partition of the one or more additional partitions;

modifying the first partition by adding the block of code corresponding to the second partition to produce a modified first partition;

modifying the second partition by removing the block of code corresponding to the second partition to produce a modified second partition;

translating the first and second modified partitions to produce a first and second modified blocks of target code, respectively; and combing the first and second modified blocks of target code and the additional blocks of target code, but not a block of target code corresponding to the second partition, to produce a modified translated target code.

11. The computer programming product of claim 8, the logic further comprising logic for:

identifying two partitions of the first and additional partitions that are stored adjacently in a memory and that have characteristics that allow them to be combined;

aggregating the two partitions into a single combined partition;

translating the combined partition to produce a modified combined block of target code; and combining the first block of target code, the additional blocks of target code and the modified combined block of target code, without blocks of target code corresponding to the two partitions, to produce a modified translated target code.

12. The computer programming product of claim 8, the logic further comprising logic for:

identifying a control flow instruction in the block of self-modifying subject code or in the one or more blocks of non-self-modifying subject code; and inserting an exit translation structure, representative of the control flow instruction, into a block of code in which the control flow instruction was identified.

13. The computer programming product of claim 12, the logic further comprising logic for:

identifying a block of code as a target of the control flow instruction; and inserting an entry translation structure into the block of code identified as the target of the control flow instruction.

14. An apparatus, comprising:
a processor;
a computer-readable memory coupled to the processor; and
logic, stored on the computer-readable memory and executed on the processor, for:
identifying a block of self-modifying subject code within a block of subject code;
identifying one or more blocks of non-self-modifying code within the block of subject code;
partitioning the block of subject code, comprising:
generating a first partition in the subject code such that the first partition includes the identified block of self-modifying subject code;
generating one or more additional partitions in the subject code such that each additional partition includes one of the identified blocks of non-self-modifying subject code, respectively, wherein subject code in each of the first partition and the one or more partitions do not overlap;
translating the first partition into a first block of target code;
translating the one or more additional partitions into a corresponding number of additional blocks of target code; and
combining the first block of target code and the additional blocks of target code to produce a translated target code.

15. The apparatus of claim 14, the logic further comprising logic for:
detecting a modification in the block of self-modifying subject code;
translating the first partition, including the modification, to produce a modified block of target code; and
combining the modified block of target code and the additional blocks of target code to produce a modified translated target code.

16. The apparatus of claim 14, the logic further comprising logic for:
detecting a modification in the block of self-modifying subject code;
detecting that the modification has modified a block of code corresponding to a second partition of the one or more additional partitions;
modifying the first partition by adding the block of code corresponding to the second partition to produce a modified first partition;
modifying the second partition by removing the block of code corresponding to the second partition to produce a modified second partition;
translating the first and second modified partitions to produce a first and second modified blocks of target code, respectively; and
combing the first and second modified blocks of target code and the additional blocks of target code, but not a block of target code corresponding to the second partition, to produce a modified translated target code.

17. The apparatus of claim 14, the logic further comprising logic for:
identifying two partitions of the first and additional partitions that are stored adjacently in a memory and that have characteristics that allow them to be combined;
aggregating the two partitions into a single combined partition;
translating the combined partition to produce a modified combined block of target code; and
combining the first block of target code, the additional blocks of target code and the modified combined block of target code, without blocks of target code corresponding to the two partitions, to produce a modified translated target code.

18. The apparatus of claim 14, the logic further comprising logic for:
identifying a control flow instruction in the block of self-modifying subject code or in the one or more blocks of non-self-modifying subject code; and
inserting an exit translation structure, representative of the control flow instruction, into a block of code in which the control flow instruction was identified.

19. The apparatus of claim 18, the logic further comprising logic for:
identifying a block of code as a target of the control flow instruction; and
inserting an entry translation structure into the block of code identified as the target of the control flow instruction.

* * * * *